May 24, 1949.　　　W. E. MARTIN　　　2,471,277
OPERATING MEANS FOR TRAILER GOOSENECKS
Filed Aug. 17, 1945　　　2 Sheets-Sheet 1

INVENTOR.
W. E. MARTIN
BY
Merrill M. Blackburn.
ATTORNEY

May 24, 1949.　　　　W. E. MARTIN　　　　2,471,277
OPERATING MEANS FOR TRAILER GOOSENECKS
Filed Aug. 17, 1945　　　　　　　　　　2 Sheets-Sheet 2

INVENTOR.
W.E. MARTIN
BY
Merrill M. Blackburn.
ATTORNEY

Patented May 24, 1949

2,471,277

UNITED STATES PATENT OFFICE 2,471,277

OPERATING MEANS FOR TRAILER
GOOSENECKS

William E. Martin, Kewanee, Ill.

Application August 17, 1945, Serial No. 611,036

12 Claims. (Cl. 214—85)

My present invention relates to the general subject matter of my prior application, Serial No. 555,171, now Patent 2,441,710, granted May 18, 1948, and more particularly to improvements in the means for raising and lowering the loading ramp, securing the same in elevated position, and releasing the same for lowering the ramp to loading position. The particular objects of this invention are the provision of mechanism whereby the gooseneck or ramp and the trailer frame supporting foot may be operated by a single hydraulic means; the provision of means for automatically withdrawing the frame supporting means into transporting position when the supporting means is no longer held in supporting position; the provision of means for holding the gooseneck in approximately horizontal position when it is desired to lower it into loading position; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 5:
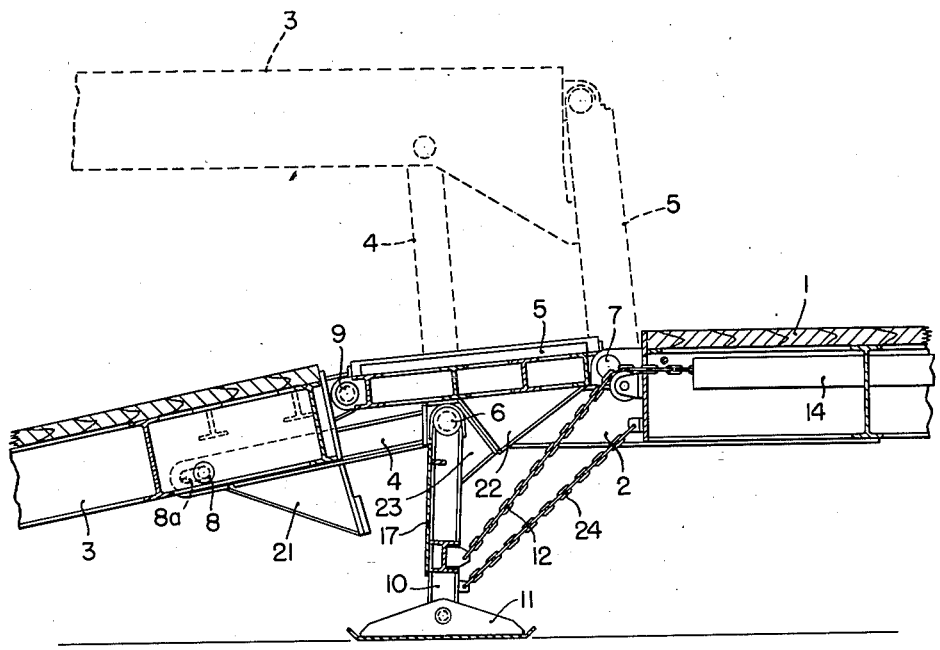
Fig. 5 represents a fragmentary longitudinal section approximately along the plane indicated by the line 5—5, Fig. 2, with parts in different positions of adjustment.

Reference will now be made in greater detail to the annexed drawings for a more complete description of this invention. As usual, the platform 1 is laid on a framework built up, primarily, of I-beams. Some of these I-beams are extended forwardly, as shown at 2, and have the landing gear connected thereto. There are a plurality, preferably four, of these forwardly extending frame members 2 to which the ramp 3 may be connected. There are forward ramp supporting links 4 and rearward links 5 which are pivotally connected, respectively, to the trailer frame at 6 and 7. They are also pivotally connected at 8 and 9 to the loading ramp 3. The geometric figure defined by the points 6, 7, 8, 9 is substantially a parallelogram but, as shown in Fig. 5, there is an elongated hole 8a in link 4 to permit departure from the parallel form when the ramp is let down into loading position. The front end thereof rests on the ground while the rear end is substantially in alignment with the front end of the trailer.

Figure 1:
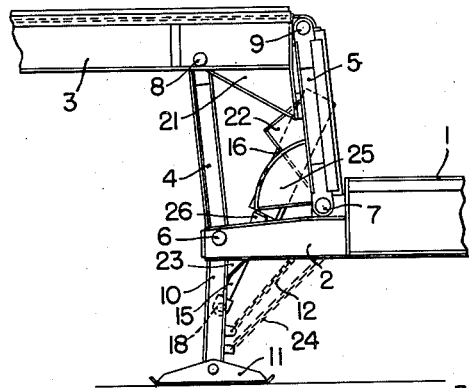
Fig. 1 represents, fragmentarily, a side elevation of a trailer and its loading ramp.
Figure 3:
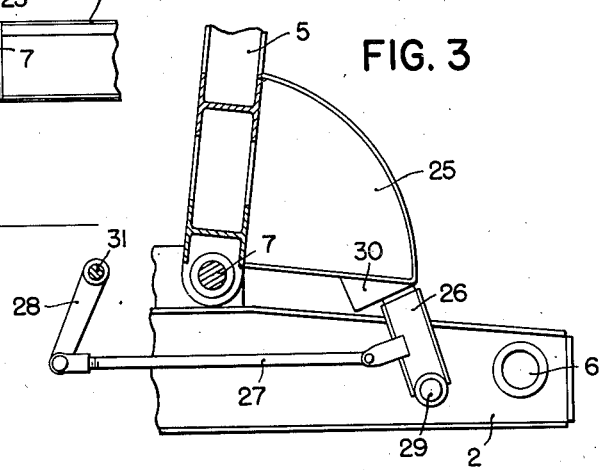
Fig. 3 represents a fragmentary sectional elevation approximately along the plane indicated by the line 3—3, Fig. 2.
Figure 2:
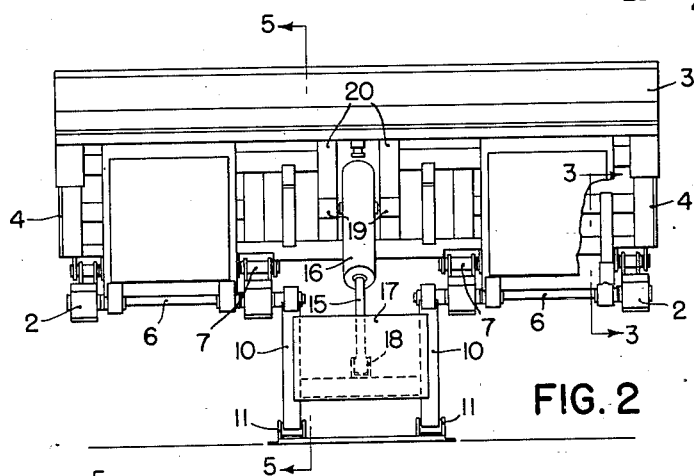
Fig. 2 represents a front elevation of a trailer embodying my present invention, with a part broken away to expose parts which would otherwise be hidden.
Figure 4:
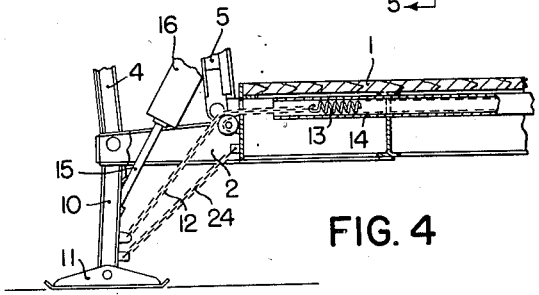
Fig. 4 represents a fragmentary longitudinal section of the front part of a trailer embodying my present invention.

The support for the front end of the trailer comprises a pair of legs 10 provided with feet 11 pivotally connected thereto. Chains 12 are connected to the legs 10 at one end and at their other end to springs 13 housed in tubes 14 beneath the trailer platform. These springs 13 extend beyond the rear ends of the tubes or pipes 14 and are there secured to the trailer frame. They are under a sufficient tension that, when nothing prevents them from doing so, they will raise the supporting means 10, 11 up under the trailer platform into what may be referred to as transporting position, since, in this position, they are out of contact with the earth and cannot interfere with the transport of the trailer. It is clear from Fig. 2 that the legs 10 are connected to shafts 6 and these are connected to the beams 2.

The ram 15, constituting a part of the piston operating in the cylinder 16, is also connected to the front end supporting means. Specifically, this is pivotally connected at 18 to a plate 17 which is secured to the legs 10, preferably by welding. The cylinder 16 is pivotally connected at 19 to a pair of sections 20 of I-beams constituting a part of the connection between the trailer platform and the ramp. It will be seen that, if the gooseneck 3 is in elevated position and the landing gear 10, 11 is elevated by the springs 13 and, if, then, the hydraulic lift 15, 16 is actuated, the first thing to happen will be that the springs 13 will be stretched and the landing gear pushed down into the position shown in the drawings. Continued actuation of the hydraulic lift will force the beams 20 farther back, turning the links 4 and 5 farther about their pivots 6 and 7 and tending to lift the front end of the gooseneck. Engagement of the feet 11 with the earth and continued actuation of the hydraulic lift causes raising of the front end of the trailer. Either the feet slide on the ground or the trailer is shoved back. Now, when the hydraulic lift is permitted to collapse, the feet support the trailer front end when the traction unit is driven away, and then the gooseneck lowers into the position shown in Fig. 5. In this position, the angular stops 22 engage the brackets 23 and prevent the legs from folding backwardly and permitting the trailer to be let down to the ground. The chain 24 prevents the legs 10 from going beyond the position shown in the drawings. The legs remain latched by the members 22 and 23 until extension of the hydraulic lift raises links 5 far enough to remove stops 22 from their blocking position. Secured to the under side of the gooseneck 3 are triangular stop members 21 which engage the adjacent face of the connecting platform referred to above and which comprises the links 5, beams 20, and other frame parts, along with the planking on top of this framework. These angular stops 21, engaging the links 5, tend to maintain a fixed angle between the links and the ramp causing lifting of the latter relatively to the links 4 beyond a certain point. This is permitted by the elongated hole 8a.

On the forward side of links 5 are quadrants 25 which cooperate with stop members 26 in holding the links and gooseneck in elevated position. Links 27 connect the stops 26 to suitable operating means 28 by means of which the stops may be turned forwardly about pivots 29 to release the gooseneck so that it may be lowered into loading position. The angular blocks 30 on the quadrants 25 prevent inadvertent slipping between the quadrants and stops 26. In the machine as constructed, the shaft 31 extends through one of the trailer side frame members and has a crank connected thereto for the operation thereof when it is desired to operate the stops to release the gooseneck.

It will of course be understood that the specific description of structure set forth above may be departed from without departing from the spirit of this invention as set forth herein and in the appended claims.

Having now described my invention, I claim:

1. Operating means for a trailer loading-ramp comprising, in combination, a trailer frame, frame-supporting means pivotally connected to the frame to be raised into transporting position and lowered into supporting position, a spring connected to the frame, a flexible means connected to the spring and to the frame-supporting means to withdraw the supporting means from supporting position, an elevatable ramp having forward and rearward links connected to the ramp and to the trailer frame serving to support the ramp in elevated position with relation to the trailer frame and carrying the ramp into loading position, and hydraulic means connecting the frame-supporting means and part of said rearward links, whereby to cause raising of said ramp and lowering of the frame-supporting means upon extension of said hydraulic means.

2. A structure of the nature indicated comprising the combination of a trailer frame, a plurality of forward and rearward connecting links connected to said frame at one end, a ramp connected to said links at their second ends for pivotal motion in an approximately vertical direction when the ramp is raised or lowered, supporting means pivotally connected to the front portion of the trailer frame and adapted to be lowered into supporting position and raised into transporting position, hydraulic means connecting the supporting means and part of the connecting links to cause lowering of the supporting means and raising of the links when the hydraulic means is extended, means for securing the ramp in elevated position when raised, and means for releasing the securing means whereby to allow the ramp to lower to loading position.

3. Operating means for a trailer loading ramp and hitch and front end support, comprising spring-actuated means for withdrawing said support from supporting position, and hydraulic means connecting the support and ramp for lowering said support into supporting position and raising the loading ramp into hitching position.

4. Operating means for a trailer loading ramp and hitch and front end support, comprising spring-actuated means for withdrawing said support from supporting position, and hydraulic means connecting the support and ramp for lowering said support into supporting position and raising the loading ramp into hitching position, the support and the ramp having cooperating means for preventing withdrawal of the support from supporting position before the ramp is elevated from loading position.

5. In a structure of the class described, a trailer having supporting beams extending longitudinally of the trailer, links connected pivotally to the forward ends of said beams, other links pivotally connected to said beams rearwardly from the first mentioned links, a loading ramp pivotally connected to the second ends of said links and serving as hitching means to connect the trailer to a traction unit, a front end support for the trailer pivotally connected to the beams and adapted to be turned into supporting position and transporting position, means for withdrawing said support into transporting position, and hydraulic means for both lowering the support toward supporting position and raising the ramp toward hitching position.

6. In a structure of the type described, a trailer having a combined hitch and loading ramp, said trailer having a front end support pivotally movable between supporting position and transport position, a platform section connecting the ramp to the trailer frame, and hydraulic means connected between the front end support and the platform section to cause lowering of the former and raising of the latter.

7. In a trailer having a front end support and a loading ramp which serves as a hitch, spring actuated means for withdrawing the support from supporting position when the trailer weight is withdrawn from the support, hydraulic means connecting the support and a part of the ramp for lowering the support into supporting position and raising the ramp into hitching position, and blocking means between the support and ramp for preventing relative pivotal motion between them when they are in loading position.

8. In a trailer, the combination of a trailer bed having a front end support, a combined trailer hitch and loading ramp, parallel linkage means connecting the front end of the bed and the ramp, a stop on the linkage means, and a cooperating stop on the support, which stops cooperate in preventing the support from folding when the ramp is in loading position.

9. A structure defined by claim 8 having connecting means between the bed and support for preventing the support from folding forwardly when the connecting means is extended to its full available length.

10. In a trailer, the combination of a trailer bed having a front end support, means for raising and lowering said support, a combined trailer hitch and loading ramp, parallel links connected at one end to the trailer bed and at their second ends to the trailer hitch and loading ramp, flexible means connecting the bed and support and holding the support against folding forwardly when the ramp is not hitched to a traction unit, and means for raising the support out of supporting position when the ramp is connected to the traction unit.

11. In a trailer, a bed having a framework and flooring, the framework extending forwardly beyond the flooring, a foldable support connected to the framework, a combined hitch and ramp, and parallel linkage means connecting the hitch and ramp to the part comprising the combined framework and flooring, and guiding the hitch when it is being raised and lowered relatively to the bed, part of the links being connected to the forward end of the bed and part rearwardly therefrom, the rearward links resting on the top of the forward end of the bed when the hitch is in loading position.

12. In a trailer having a bed, linkage means connected to one end thereof, and a combined hitch and loading ramp connected to the linkage means; a front end support for the bed, a stop connected to the linkage means and projecting in the same direction as the hitch, a stop pivoted on the front end portion of the bed and adapted to be turned into stopping position with relation to the stop on the linkage means, and actuating means for turning the pivoted stop into position to be engaged by the stop on the linkage means, whereby to prevent the linkage means from turning with relation to the bed.

WILLIAM E. MARTIN.

REFERENCES CITED

The following references are of record in the file of this patent:

UNITED STATES PATENTS

| Number | Name | Date |
| --- | --- | --- |
| 2,131,949 | Helmig | Oct. 4, 1938 |
| 2,383,666 | Martin | Aug. 28, 1945 |